United States Patent
Anderson et al.

(10) Patent No.: US 11,106,969 B2
(45) Date of Patent: Aug. 31, 2021

(54) METHOD AND APPARATUS FOR DRIVER IDENTIFICATION LEVERAGING TELEMATICS DATA

(71) Applicant: International Business Machines Corporation, Armonk, NY (US)

(72) Inventors: John C. Anderson, Bridgewater, NJ (US); Peter J. Arterburn, Frisco, TX (US); Wei S. Dong, Beijing (CN); Chang S. Li, Beijing (CN); Philip L. Schwartz, Newburyport, MA (US); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 15/409,817

(22) Filed: Jan. 19, 2017

(65) Prior Publication Data
US 2018/0204119 A1 Jul. 19, 2018

(51) Int. Cl.
*G06Q 30/02* (2012.01)
*G06F 16/33* (2019.01)
(Continued)

(52) U.S. Cl.
CPC .......... *G06N 3/0454* (2013.01); *B60W 40/09* (2013.01); *B60W 2040/0809* (2013.01);
(Continued)

(58) Field of Classification Search
CPC ............... G06N 3/0454; B60W 40/09; B60W 2552/00; B60W 2556/50; B60W 2555/20;
(Continued)

(56) References Cited

U.S. PATENT DOCUMENTS 7,983,835 B2 *  7/2011  Lagassey ............... G07C 5/008
                                                             340/907
8,260,515 B2    9/2012  Huang et al.
(Continued)

OTHER PUBLICATIONS

Choi et al; "Analysis and Classification of Driver Behavior using In-Vehicle CAN-Bus Information"; Erik Jonsson School of Engineering and Computer Science, University of Texas at Dallas; 2007; 6 pp.

(Continued)

*Primary Examiner* — Brandon S Cole
(74) *Attorney, Agent, or Firm* — Reza Sarbakhsh

(57) ABSTRACT

Methods and apparatus, including computer program products, implementing and using techniques for identifying a driver of a vehicle. Measurement values representing the movement of a vehicle are received from one or more sensors measuring features relating to the movement of the vehicle. Instantaneous dimensions for measuring driver identification are defined. For each dimension statistical features within a given time frame are calculated and a feature map is built, including the time frame and the statistical features. A set of driving features is extracted from the feature map. The set of extracted driving features is compared with previously extracted sets of driving features to create a set of similarity metrics between two drivers. A classification model is trained based on the similarity metrics and is used with the similarity metrics to determine whether data pertaining to a new trip segment should be associated with a known or unknown driver.

17 Claims, 3 Drawing Sheets

(51) Int. Cl.
  *G06F 16/38* (2019.01)
  *G06Q 30/00* (2012.01)
  *G06N 3/04* (2006.01)
  *B60W 40/09* (2012.01)
  *B60W 40/08* (2012.01)

(52) U.S. Cl.
  CPC ..... *B60W 2420/42* (2013.01); *B60W 2420/52* (2013.01); *B60W 2520/105* (2013.01); *B60W 2552/00* (2020.02); *B60W 2555/20* (2020.02); *B60W 2555/60* (2020.02); *B60W 2556/50* (2020.02)

(58) Field of Classification Search
  CPC ..... B60W 2555/60; B60W 2040/0809; B60W 2420/42; B60W 2420/52; B60W 2520/105
  USPC ....................................................... 706/1–62
  See application file for complete search history.

(56) References Cited

U.S. PATENT DOCUMENTS

| | | | |
|---|---|---|---|
| 8,634,980 B1 | 1/2014 | Urmson et al. | |
| 9,158,962 B1* | 10/2015 | Nemat-Nasser | ... G06K 9/00845 |
| 9,501,690 B2* | 11/2016 | Nemat-Nasser | ... G06K 9/00845 |
| 2011/0313988 A1* | 12/2011 | Ghosh | ................... G06F 16/334 |
| | | | 707/706 |
| 2013/0018968 A1* | 1/2013 | Pennacchiotti | .... G06Q 30/0201 |
| | | | 709/206 |
| 2015/0307106 A1* | 10/2015 | Rao | ........................ B60W 50/14 |
| | | | 701/29.1 |
| 2015/0379331 A1* | 12/2015 | Nemat-Nasser | ... G06K 9/00845 |
| | | | 382/118 |
| 2016/0221592 A1* | 8/2016 | Puttagunta | .............. B61L 25/04 |
| 2017/0032281 A1* | 2/2017 | Hsu | ...................... B23K 9/0953 |
| 2018/0025249 A1* | 1/2018 | Liu | .......................... G06N 3/04 |
| | | | 382/158 |
| 2018/0204119 A1* | 7/2018 | Anderson | ............. B60W 40/09 |

OTHER PUBLICATIONS

Liu et al; "Learning Drivers' Behaviour with Deep Neural Networks"; Carnegie Mellon University Silicon Valley; Project Sponsor: TOYOTA InfoTechnology Center; 1 page.

Quintero et al; "Driver Behavior Classification Model based on an Intelligent Driving Diagnosis System"; 2012 15th International IEEE Conference on Intelligent Transportation Systems Anchorage, Alaska, USA, Sep. 16-19, 2012. 6 pp.

Wakita et al; "Driver Identification Using Driving Behavior Signals"; IEICE Trans. Inf. & Syst., vol. E89-D, No. 3; Oxford University Press Oxford, UK; Mar. 2006. 8 pp.

\* cited by examiner

METHOD AND APPARATUS FOR DRIVER IDENTIFICATION LEVERAGING TELEMATICS DATA

BACKGROUND

The present invention relates to telematics, and more specifically to using telematics data in conjunction with vehicles. People have their own "signature" driving styles, for example, the way they accelerate, brake and turn within various combinations of driving contexts such as road shapes, traffic conditions and weather events.

In many situations, it would be useful to capture these signatures to determine who the actual driver of a car is. For example, in the event of an accident or a situation with suspected drunk driving, it might be useful to know who was driving the car. Furthermore, insurance companies, fleet management companies, and rental car firms may have an interest in determining the actual driver of a vehicle.

There have been various attempts to accomplish this. Existing techniques typically require that all the driving features be handcrafted, thus relying on considerable human efforts to develop and test the algorithms. This manual approach typically limits the amount and quality of analytical insights that they algorithms can provide. There have been attempts to use a deep learning network in the context of vehicles, but for solving a totally different problem, namely predicting drivers' turning and lane changing behavior.

Such techniques often require expensive or dedicated in-vehicle sensors (LIDAR, RADAR, Video Camera) to derive specialized metrics like the distance to vehicles ahead, lane departure, pedal movements, etc., and thus are not applicable for scenarios that require generally available low cost telematics sensors like GPS devices. Further, none of the existing solutions is specifically designed for the purpose of driver identification in real business/industry scenarios. As a result, their accuracy, efficiency and economic models cannot support what is needed, for example, in actual insurance business use cases.

SUMMARY

According to one embodiment of the present invention, methods, systems and computer program products are provided for identifying a driver of a vehicle. A trip split engine receives a sequence of measurement values from one or more sensors measuring features relating to the movement of a vehicle. The sequence of measurement values represents a trip segment for the vehicle. A feature map transformer defines a number of instantaneous dimensions for measuring driver identification. For each dimension the feature map transformer calculates statistical features within a given time frame and builds a feature map, where a first dimension represents the time frame and another dimension represents the calculated statistical features. A deep neural network model engine extracts a set of driving features from the feature map using a deep neural network model. A similarity model engine compares the set of extracted driving features with previously extracted sets of driving features to create a set of similarity metrics between two drivers. A trip classification engine trains a classification model based on the similarity metrics and uses the classification model and the similarity metrics to determine whether data pertaining to a new trip segment should be associated with an unknown driver or with a known driver.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for identifying a driver of a vehicle based on recorded telematics data that describes a "signature" driving style for a driver. Real-time data collected by sensors can be used as input to identify whether a specific driver is driving. For example, some in-vehicle or mobile sensors that can be used to collect data include Global Positioning System (GPS) sensors, accelerometers, three-axis gyroscopes, etc. A feature matrix is then defined, which encodes driving behaviors from the recorded GPS data, using deep neural networks to identify the specific driver. New trip data for driver classification is continually ingested and used for clustering. This makes it possible for the neural network to automatically learn the driving signatures of different drivers without any human intervention, which generates better early results, and has a greater potential to improve with more data and sophisticated network input.

Being able to accurately identify driver behavior can be used, for example, to allow Global Insurance Companies, Fleet Management firms, Self Service Rental Car companies and Automobile Companies to drive new business initiatives. Such business initiatives may include:

Improved risk profiling

Improved understanding of driver habits—Does the driver speed? Does he break suddenly? Is he unable to drive straight? Is he unable to properly control a car in the snow? etc. This has the potential to drive more accurate pricing for current insurance cycles, renewals and future car policies, which currently do not rely on how safe a driver actually is, but just on general facts such as car type, car age, driver age, driver sex, driver accident record, driver ticket record, car parking profile, car use profile, driver state/county of residence, etc.

It will give insurance underwriters much more insight into the real risk profiles for drivers.

New levels of understanding the impact of environmental conditions on driving (e.g., bad weather, smog, sun glare, traffic flow, etc.)

Tired or fatigued warnings/evaluations.

Productivity/shift management extensions.

Driver performance evaluations.

Route optimization insights.

Figure 1:
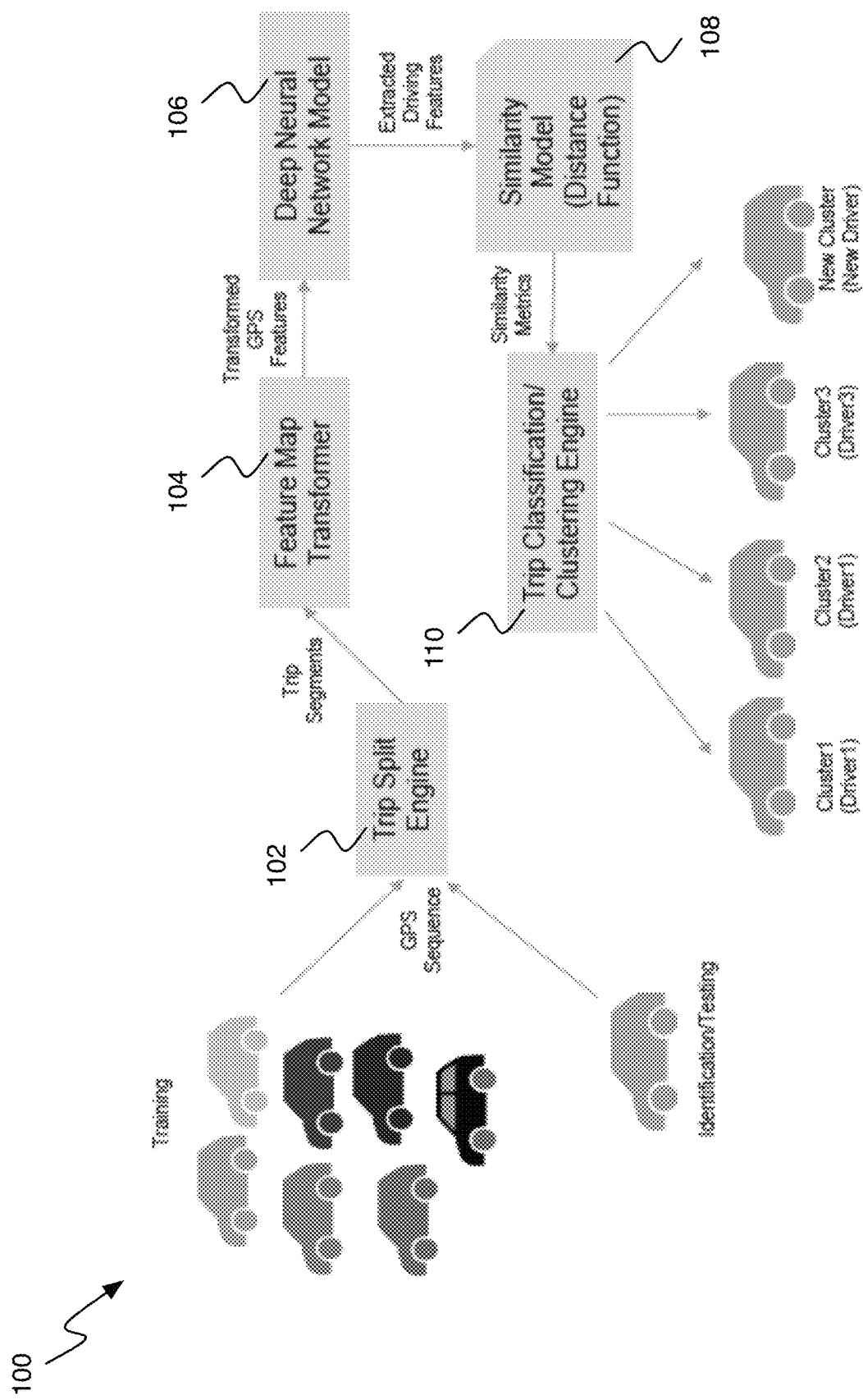
FIG. 1 shows a schematic view of a system 100 for driver identification, in accordance with one embodiment.
Figure 2:
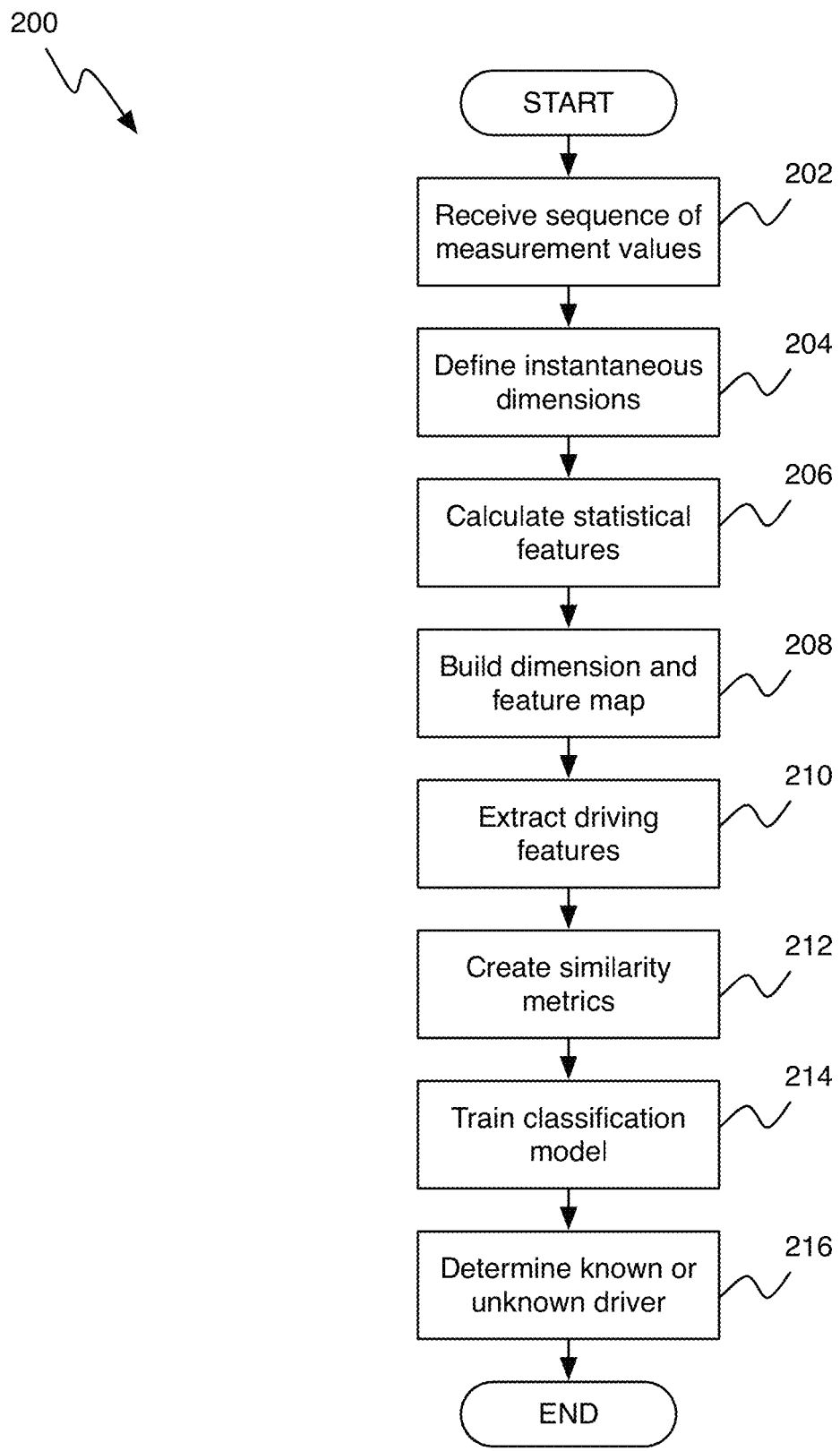
FIG. 2 shows a flowchart of a process 200 for driver identification, in accordance with one embodiment.

The invention in accordance with one embodiment of the invention will now be described by way of example and with reference to FIGS. 1 and 2. FIG. 1 shows a schematic system 100 for driver identification, in accordance with one embodiment of the invention, and FIG. 2 shows a flowchart of a process 200 for driver identification, in accordance with one embodiment of the invention. As can be seen in FIG. 1, the system 100 includes a trip split engine 102, a feature map transformer 104, a deep neural network model engine 106, a similarity model engine 108, and a trip classification/clustering engine 110.

In step 202, the trip split engine 102 receives sequences of measurements, such as real-time GPS data, collected by sensors in the vehicles. As was described above, GPS data is only one example, and there may be many other types of sensors that generate measurement values relating to the movement of a vehicle, such as accelerometers, gyroscopes, etc. In order to collect a sufficient amount of data for identifying driving behavior, it is important that the sampling rate of the sensors is sufficiently high. For example, in one embodiment, the sampling rate may be approximately 1 Hz. The received measurements are grouped into trip segments. The segmentation is done by the dividing of a trip (which could be arbitrary duration of time) into smaller normalized sub-trips with reasonable length (e.g., 120 seconds), and then each sub-trip is transformed to a corresponding feature map and for further analytics, e.g., calculating distance.

After forming the trip segments, the trip split engine 102 sends the trip segments to the feature map transformer 104. In step 204, the feature map transformer 104 defines instantaneous basic features from the received trip segments, such as speed (direction, norm, etc.); changes of speed direction, norm, etc.; acceleration (direction, norm, etc.); changes of acceleration direction, norm, etc.; angular speed (direction, norm, etc.), and changes of angular speed direction, norm, etc. The feature map transformer 104 also calculates statistical features for each basic feature within a given time frame, for example, 5 seconds, in step 206. The statistical features can include, for example, mean, median, min, max, standard deviation, quantities, histograms, etc., as is familiar to those having ordinary skill in the statistics art.

The feature map transformer 104 then uses the statistical features to build a feature map in step 208, in which one axis represents the time frame and the other axes represent the calculated statistical features and their values. The feature map is then transferred from the feature map transformer 104 to the deep neural network model engine 106.

The deep neural network model engine 106 extracts a set of driving features in step 210, using deep Convolutional Neural Networks (CNNs) and/or Recurrent Neural Networks (RNNs), from the received feature map. The features are complex combinations of vehicle movements including speed, acceleration, and angular speed, etc., and statistics describing their distributions in a short time period. The extracted driving features are then transferred to the similarity model engine 108.

In step 212, the similarity model engine 108 uses the outputs of the last fully connected layer in the neural network model engine as inputs and applies a distance function to determine the maximum, minimum or average distance between two trip segments as the distance of the corresponding trips. The goal is to calculate the similarity between trips (or trip segments) in terms of driving habits/style. Similar trips indicate that these trips are possibly driven by a same driver. Some examples of the distance functions that can be used to determine the maximum, minimum or average distance include Euclidean distance, Cosine distance, or Mahalanobis distance. Those with expertise in this area can apply many other types of distance functions. The output from the similarity model engine 108 is a set of similarity metrics. A similarity metric is a pairwise function that defines the similarity between two trips mathematically. For example, the equation $f(x,y)=z$ defines that the similarity between trips x and y is z. The similarity metrics are then transferred to the trip classification/clustering engine 110.

The trip classification/clustering engine 110 can operate in two different modes; a training mode and a testing mode. In the training mode, the trip classification/clustering engine 110 receives the similarity metrics from the similarity model engine 108 and uses the similarity metrics to train a classification model or clustering model, step 214. Some examples of clustering models include a Support Vector Machine (SVM) model, and a K-means model. It should be realized that these are just a couple of examples of models that can be used, and many others are within the grasp of those having ordinary skill in the art.

Once the clustering model has been created, the trip classification/clustering engine 110 can be used in the testing mode, as shown in step 216. Computational time for the model depends on data size and algorithm complexity. The number of cases can be flexible as in real-world applications.

In this mode, data for new trips are ingested into the trip classification/clustering engine 110. The incoming data is checked by the trip classification/clustering engine 110 to see if it can be assigned to an existing class or cluster. Here, "classes" refers to patterns with known labels (e.g., driver IDs) in supervised learning paradigms. "Clusters" refers to patterns with unknown labels in unsupervised learning paradigms, where the ground truth is unknown and can only be inferred from data.

If the data belongs to an existing class or cluster, that is, the incoming data is associated with a known driver, the classifiers/clusters are output. If the data does not belong to an existing class or cluster the trip classification/clustering engine 110 switches to the training mode and further improves the classification model based on the incoming data. By continually ingesting data for new trips and drivers into the system, the classification models can be significantly improved and driver signatures can be more accurately classified.

Context data can be calibrated to the feature maps (inputs of the neural networks) as new rows, which can be seen as adding additional features, so that the neural networks can automatically discover the correlation between contexts and other vehicle movement features during training, and thus find more useful patterns for driver identification.

Figure 3:
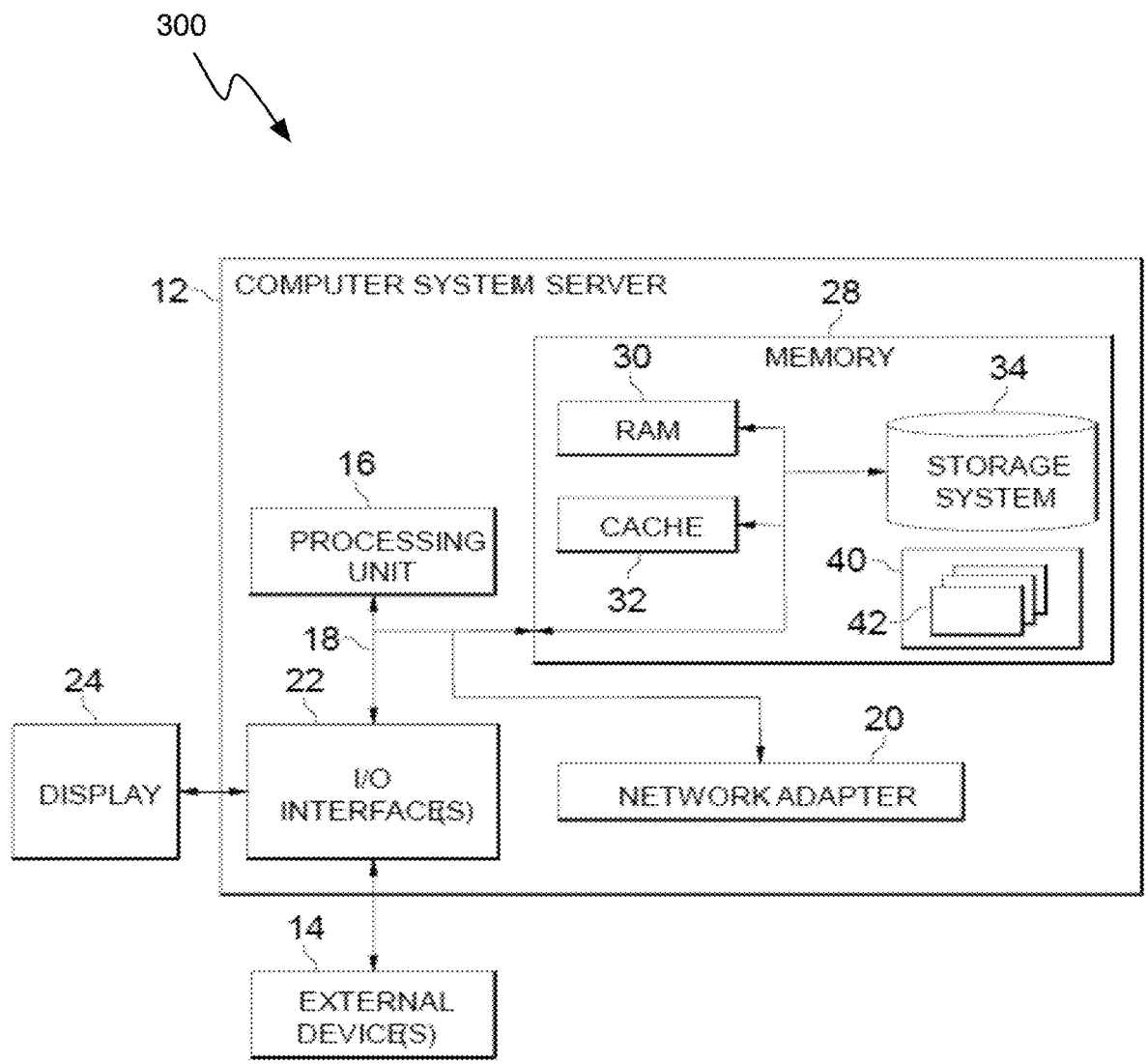
FIG. 3 shows a computer system 300 in which the process 200 for driver identification can be implemented, in accordance with one embodiment.

FIG. 3 shows a schematic view of a computer system in which various embodiments of the present invention can be implemented. As shown in FIG. 3, the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system/server 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying a driver of a vehicle based on recorded telematics data, comprising:
   receiving, by a trip split engine, a sequence of measurement values from one or more telematics sensors measuring features relating to the movement of a vehicle, wherein the sequence of measurement values represents a trip segment of an arbitrary period of time for the vehicle;
   defining, by a feature map transformer, a number of instantaneous dimensions for measuring driver identification;
   for each dimension, calculating by the feature map transformer, statistical features within a given time frame;
   building, by the feature map transformer, a feature map, in which map a first dimension represents the time frame and another dimension represents the calculated statistical features;
   extracting, by a deep neural network model engine, a set of driving features from the feature map using a deep neural network model;
   comparing, by a similarity model engine, the set of extracted driving features with previously extracted sets of driving features to create a set of similarity metrics between two drivers;
   training, by a trip classification engine, a multi-variable classification model based on the similarity metrics; and
   using, by the trip classification engine, the classification model and the similarity metrics to determine whether data pertaining to a new trip segment should be associated with an unknown driver or with a known driver, wherein the determination is made by referencing recorded telematics data.

2. The method of claim 1, wherein the telematics sensors include one or more of:
   global positioning system sensors, accelerometers, gyroscopes, On-Board Diagnostic sensors, Controller Area Network buses, and cameras.

3. The method of claim 1, wherein the telematics sensors have actual sampling rates in the range of approximately 0.25-5 Hz.

4. The method of claim 1, further comprising:
   continuously improving the classification model based on new trips generated.

5. The method of claim 1, further comprising:
   receiving data from additional sources and using the received data to further enhance driver identification.

6. The method of claim 5, wherein the additional sources include one or more of: Radar, LIDAR, video, road attributes, road condition, real-time traffic condition, events happening on roads, traffic light real-time data, and weather conditions.

7. A computer program product for identifying a driver of a vehicle based on recorded telematics data, the computer program product comprising a computer readable storage medium having program instructions embodied therewith, wherein the computer readable storage medium is not a transitory signal per se, the program instructions being executable by a processor to cause the processor to perform a method comprising:
   receiving, by a trip split engine, a sequence of measurement values from one or more telematics sensors measuring features relating to the movement of a vehicle, wherein the sequence of measurement values represents a trip segment of an arbitrary period of time for the vehicle;
   defining, by a feature map transformer, a number of instantaneous dimensions for measuring driver identification;
   for each dimension, calculating by the feature map transformer, statistical features within a given time frame;
   building, by the feature map transformer, a feature map, in which map a first dimension represents the time frame and another dimension represents the calculated statistical features;

extracting, by a deep neural network model engine, a set of driving features from the feature map using a deep neural network model;

comparing, by a similarity model engine, the set of extracted driving features with previously extracted sets of driving features to create a set of similarity metrics between two drivers;

training, by a trip classification engine, a multi-variable classification model based on the similarity metrics; and using, by the trip classification engine, the classification model and the similarity metrics to determine whether data pertaining to a new trip segment should be associated with an unknown driver or with a known driver, wherein the determination is made by referencing recorded telematics data.

8. The computer program product of claim 7, wherein the telematics sensors include one or more of: global positioning system sensors, accelerometers, gyroscopes, On-Board Diagnostic sensors, Controller Area Network buses, and cameras.

9. The computer program product of claim 7, wherein the telematics sensors have actual sampling rates in the range of approximately 0.25-5 Hz.

10. The computer program product of claim 7, wherein the method further comprises:
continuously improving the classification model based on new trips generated.

11. The computer program product of claim 7, wherein the method further comprises:
receiving data from additional sources and using the received data to further enhance driver identification.

12. The computer program product of claim 11, wherein the additional sources include one or more of: Radar, LIDAR, video, road attributes, road condition, real-time traffic condition, events happening on roads, traffic light real-time data, and weather conditions.

13. A system comprising for identifying a driver of a vehicle based on recorded telematics data:
a trip split engine, configured to:
receive a sequence of measurement values from one or more telematics sensors measuring features relating to the movement of a vehicle, wherein the sequence of measurement values represents a trip segment of an arbitrary period of time for the vehicle;
a feature map transformer configured to:
define a number of instantaneous dimensions for measuring driver identification, for each dimension, calculate statistical features within a given time frame, and
build a feature map, in which map a first dimension represents the time frame and another dimension represents the calculated statistical features;
a deep neural network model engine configured to:
extract a set of driving features from the feature map using a deep neural network model;
a similarity model engine configured to:
compare the set of extracted driving features with previously extracted sets of driving features to create a set of similarity metrics between two drivers; and
a trip classification/clustering engine configured to:
train a multi-variable classification model based on the similarity metrics, and
use the classification model and the similarity metrics to determine whether data pertaining to a new trip segment should be associated with an unknown driver or with a known driver, wherein the determination is made by referencing recorded telematics data.

14. The system of claim 13, wherein the telematics sensors include one or more of: global positioning system sensors, accelerometers, gyroscopes, On-Board Diagnostic sensors, Controller Area Network buses, and cameras.

15. The system of claim 13, wherein the telematics sensors have actual sampling rates in the range of approximately 0.25-5 Hz.

16. The system of claim 13, wherein the trip split engine is further configured to:
receive data from additional sources and using the received data to further enhance driver identification.

17. The system of claim 16, wherein the additional sources include one or more of: Radar, LIDAR, video, road attributes, road condition, real-time traffic condition, events happening on roads, traffic light real-time data, and weather conditions.

* * * * *